(12) United States Patent
Rockel et al.

(10) Patent No.: US 12,035,065 B2
(45) Date of Patent: Jul. 9, 2024

(54) CONTROL AND SYNCHRONIZATION IN VIDEO PRODUCTION

(71) Applicant: Ross Video Limited, Iroquois (CA)

(72) Inventors: Kevin Rockel, Ottawa (CA); Michel Paquin, Ashton (CA); David Rooney, Carp (CA)

(73) Assignee: Ross Video Limited, Iroquois (CA)

( * ) Notice: Subject to any disclaimer, the term of this patent is extended or adjusted under 35 U.S.C. 154(b) by 226 days.

(21) Appl. No.: 17/840,128

(22) Filed: Jun. 14, 2022

(65) Prior Publication Data

US 2022/0407984 A1  Dec. 22, 2022

Related U.S. Application Data

(60) Provisional application No. 63/212,291, filed on Jun. 18, 2021.

(51) Int. Cl.
| | |
|---|---|
| *H04N 5/067* | (2006.01) |
| *H04N 5/05* | (2006.01) |
| *H04N 21/242* | (2011.01) |
| *H04N 21/43* | (2011.01) |

(52) U.S. Cl.
CPC ............. *H04N 5/067* (2013.01); *H04N 5/05* (2013.01); *H04N 21/242* (2013.01); *H04N 21/4307* (2013.01)

(58) Field of Classification Search
None
See application file for complete search history.

(56) References Cited

U.S. PATENT DOCUMENTS

| 8,743,292 B2 | 6/2014 | Atherton et al. |
| 2013/0194496 A1* | 8/2013 | Atherton ............... H04N 21/242 |
| | | 348/E9.034 |

* cited by examiner

*Primary Examiner* — Xiaolan Xu
(74) *Attorney, Agent, or Firm* — Cesari and McKenna, LLP (57) ABSTRACT

Index values are periodically incremented at a central or primary video production control system and a video production control system node. Messages that include or otherwise indicate current index values generated by the primary video production control system are transmitted to the video production control system node, and the node reflects the messages back to the primary video production control system. The primary video production control system determines a round-trip message time, associated with the video production control system node, based on the transmitted messages and reflections of the messages received from the node. A further message that includes or otherwise indicates an instruction for execution of a task at a target execution time, is transmitted by the primary video production control system to the node at a time, in advance of the target execution time, that is based on the round-trip message time.

24 Claims, 3 Drawing Sheets

CONTROL AND SYNCHRONIZATION IN VIDEO PRODUCTION

CROSS-REFERENCE TO RELATED APPLICATION

This application is related to, and claims the benefit of, U.S. Provisional Patent Application No. 63/212,291, filed on Jun. 18, 2021, the entire contents of which are incorporated herein by reference.

FIELD OF THE INVENTION

This invention relates generally to video production and, in particular, to controlling and synchronizing production devices in a video production system.

BACKGROUND

Synchronizing events across systems with variable communication delay among the systems can be a challenge. For example, video production may involve managing inputs and/or outputs from multiple distributed systems or equipment, over Internet connections for example, with different delay or latency between a primary video production control system at a central location and production devices at one or more other locations remote from the central location.

Timing of events can be especially important in applications such as video production. Consider an example of live video production that involves multiple video feeds from multiple robotic or motorized cameras, and a transition from one camera to another. Any movement of the camera to which the transition is to be made should be completed before the transition. Otherwise, a final video output for broadcast and/or display could capture the camera movement or be delayed until the camera movement is completed, neither of which is desirable.

This simple example involves only two cameras and video feeds, whereas video production often involves many more than two inputs or outputs from many more than two devices. Control and synchronization becomes a much greater challenge with more inputs or outputs from more production devices.

U.S. Pat. No. 8,743,292, issued on Jun. 3, 2014, discloses video/audio production processing control synchronization, and relates to processing of production signals.

Another possible approach to synchronization involves using Network Time Protocol (NTP), but does not provide a minimum safe time to ensure message delivery.

A third possible approach would be to send messages and simply execute each message when it arrives, regardless of latency encountered during transmission. This does not provide any consistent or bounded accuracy for timing of execution of a message.

SUMMARY

According to an aspect of the present disclosure, an apparatus includes: an index generator to generate an index value that is periodically incremented; a communication interface to enable communication with a video production control system node; and a central synchronization element, coupled to the index generator and to the communication interface, to: transmit, to the video production control system node through the communication interface, first messages comprising respective current index values generated by the index generator; determine a round-trip message time, associated with the video production control system node, based on the transmitted first messages and reflections of the first messages received from the video production control system node through the communication interface; and transmit, to the video production control system node through the communication interface, a second message comprising an instruction for execution of a task at a target execution time, wherein the central synchronization element is configured to transmit the second message at a time, in advance of the target execution time, that is based on the round-trip message time.

In some embodiments, the central synchronization element is configured to determine the round-trip message time based on respective differences between a current index value generated by the index generator at receipt of each of the reflections of the first messages and the current value generated by the index generator at transmission of each of the first messages.

In some embodiments, the round-trip message time associated with the video production control system node is a maximum round-trip message time among respective round-trip message times for a number of the first messages.

In some embodiments, the second message further comprises a future index value, the future index value comprising an expected index value to be generated by the index generator at the target execution time less half the round-trip message time associated with the video production control system node.

In some embodiments, the index generator is configured to increment the index value based on any one of: a clock pulse, a central processing unit (CPU) system time, and a video frame rate.

In some embodiments, a time interval at which the index value is incremented is below a maximum synchronization error between the apparatus and the video production control system node.

In some embodiments, the communication interface is configured to enable communication with a plurality of video production control system nodes; and the central synchronization element is configured to: transmit first messages, comprising respective current index values generated by the index generator, to each video production control system node, determine a respective round-trip message time associated with each video production control system node, and transmit a respective second message to each video production control system node at a time in advance of the target execution time that is based on the round-trip message times associated with each video production control system node.

In some embodiments, the central synchronization element is configured to transmit the respective second message to each video production control system node at a respective time in advance of the target execution time that is based on the respective round-trip message time associated with each video production control system node, or at a same time in advance of the target execution time that is based on a longest of the respective round-trip message times of the video production control system nodes.

In some embodiments, the video production control system node comprises an intermediate video production control system node configured to communicate with a production device that is to execute the task at the target execution time.

In some embodiments, either or both of the determined round-trip time and the time in advance of the target execution time is further based on a communication delay between the intermediate video production control system node and the production device.

In some embodiments, the communication interface enables communication with the video production control system node over an Internet connection.

A video production system may include a primary video production control system comprising such an apparatus, and the video production control system node.

Another aspect of the present disclosure relates to an apparatus comprising: a first index generator to generate an index value that is periodically incremented; a communication interface to enable communication with a primary video production control system; and a synchronization element, coupled to the first index generator and to the communication interface, to: receive, from the primary video production control system through the communication interface, first messages comprising respective index values generated by a second index generator of the primary video production control system at respective transmission times of the first messages; determine respective difference values based on respective current index values generated by the first index generator at reception of the first messages and the index values in the received first messages; transmit, to the primary video production control system through the communication interface, reflections of the first messages; and receive, from the primary video production control system through the communication interface, a second message comprising an instruction for execution of a task at a target execution time, the second message having been transmitted by the primary video production control system at a time, in advance of the target execution time, that is based on a round-trip message time determined by the primary video production control system from the respective index values generated by the second index generator at the respective transmission times of the first messages and respective index values generated by the second index generator at respective reception times of the reflections of the first messages by the primary video production control system.

In some embodiments, the apparatus further comprises a memory coupled to the synchronization element, and the synchronization element is configured to store a number of the difference values in the memory.

In some embodiments, the second message further comprises a future index value, and the synchronization element is further configured to determine an average difference value based on the difference values stored in the memory, and to determine a future value to be generated by the first index generator at the target execution time as a difference between the future index value in the second message and the average difference value.

In some embodiments, the first index generator is configured to increment the index value based on any one of: a clock pulse, a CPU system time, and a video frame rate.

In some embodiments, the apparatus comprises an intermediate video production control system node configured to communicate with a production device that is to execute the task at the target execution time.

In some embodiments, the intermediate video production control system node is configured to communicate with the production device at a further time, in advance of the target execution time, that is based on a communication delay between the intermediate video production control system node and the production device.

In some embodiments, the communication interface enables communication with the primary video production control system over an Internet connection.

In some embodiments, a video production system comprises a video production control system node comprising such an apparatus, and the primary video production control system.

More generally, a video production system may comprise a primary video production control system as disclosed herein, and one or more video production control system nodes as disclosed herein.

Method embodiments are also disclosed, and an example method comprises: transmitting, to a video production control system node, first messages comprising respective current index values that are periodically incremented; determining a round-trip message time, associated with the video production control system node, based on the transmitted first messages and reflections of the first messages received from the video production control system node; and transmitting, to the video production control system node, a second message comprising an instruction for execution of a task at a target execution time, wherein the second message is transmitted at a time, in advance of the target execution time, that is based on the round-trip message time.

In some embodiments, the determining comprises determining the round-trip message time based on respective differences between a current index value generated at receipt of each of the reflections of the first messages and the current value generated at transmission of each of the first messages.

In some embodiments, the round-trip message time associated with the video production control system node is a maximum round-trip message time among respective round-trip message times for a number of the first messages.

In some embodiments, the second message further comprises a future index value, the future index value comprising an expected index value at the target execution time less half the round-trip message time associated with the video production control system node.

In some embodiments, the index value is incremented based on any one of: a clock pulse, a CPU system time, and a video frame rate.

In some embodiments, a time interval at which the index value is incremented is below a maximum synchronization error.

In some embodiments, a method further comprises, for each of a plurality of video production control system nodes: transmitting first messages, comprising respective current index values, to each video production control system node, determining a respective round-trip message time associated with each video production control system node, and transmitting a respective second message to each video production control system node at a time in advance of the target execution time that is based on the round-trip message times associated with each video production control system node.

In some embodiments, transmitting a respective second message comprises transmitting the respective second message to each video production control system node at a respective time in advance of the target execution time that is based on the respective round-trip message time associated with each video production control system node, or at a same time in advance of the target execution time that is based on a longest of the respective round-trip message times of the video production control system nodes.

In some embodiments, the video production control system node comprises an intermediate video production control system node configured to communicate with a production device that is to execute the task at the target execution time.

In some embodiments, either or both of the determined round-trip time and the time in advance of the target execution time is further based on a communication delay between the intermediate video production control system node and the production device.

In some embodiments, one or more of transmitting the first messages, receiving the reflections of the first messages, and transmitting the second message involves communication with the video production control system node over an Internet connection.

Another method disclosed herein comprises: receiving, from a primary video production control system, first messages comprising respective index values generated by the primary video production control system at respective transmission times of the first messages; determining respective difference values based on index values generated at reception times of the first messages and the index values in the received first messages; transmitting, to the primary video production control system, reflections of the first messages; and receiving, from the primary video production control system, a second message comprising an instruction for execution of a task at a target execution time, the second message having been transmitted by the primary video production control system at a time, in advance of the target execution time, that is based on a round-trip message time determined by the primary video production control system from the respective index values in the first messages and respective index values generated by the primary video production control system at respective reception times of the reflections of the first messages.

In some embodiments, the method further comprises storing a number of the difference values in a memory.

In some embodiments, the second message further comprises a future index value to be generated by the primary video production control system at the target execution time, and the method further comprises: determining an average difference value based on the difference values stored in the memory; and determining a difference between the future index value in the second message and the average difference value.

In some embodiments, the index values generated at reception times of the first messages are incremented based on any one of: a clock pulse, a CPU system time, and a video frame rate.

In some embodiments, a method further comprises: communicating with a production device that is to execute the task at the target execution time.

In some embodiments, communicating with the production device comprises communicating with the production device at a further time, in advance of the target execution time, that is based on a communication delay between the intermediate video production control system node and the production device.

In some embodiments, one or more of receiving the first messages, transmitting the reflections of the first messages, and receiving the second message involves communication with the primary video production control system over an Internet connection.

In some embodiments, a method involves performing operations at a primary video production control system, and performing operations at one or more video production control system nodes.

Another aspect of the present disclosure relates to a non-transitory computer-readable storage medium storing instructions which, when executed by a processor, cause the processor to perform a method as disclosed herein.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
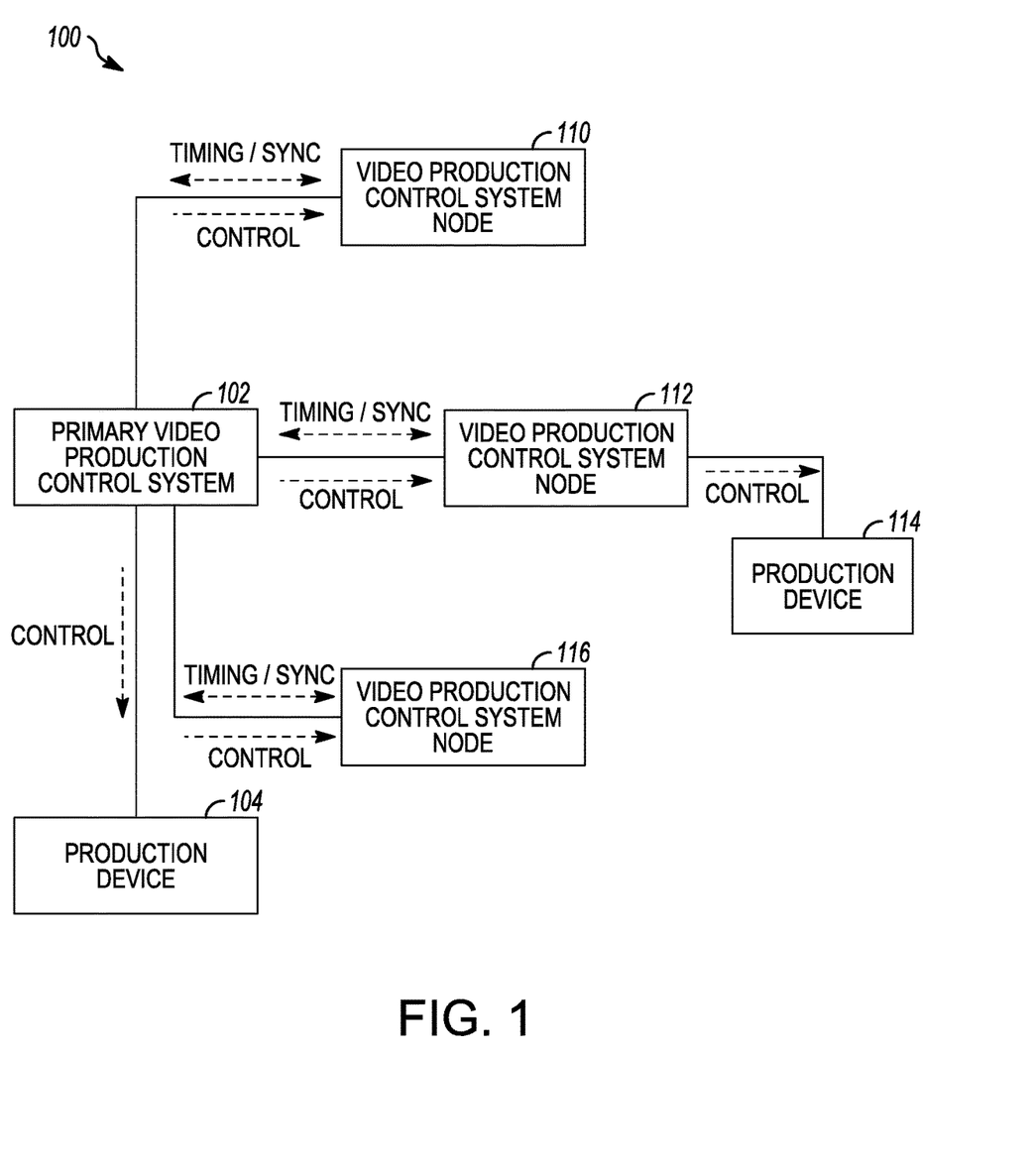
FIG. 1 is a block diagram of an example video production system.

FIG. 1 is a block diagram of an example video production system 100. The example video production system 100 includes a primary video production control system 102, production devices 104, 114, and video production control system nodes 110, 112, 116.

In the example shown, the primary video production control system 102 and the video production control system nodes 110, 112, 116 are parts of a video production control system. The primary video production control system 102 may also or instead be referred to as a production control system or equipment, a control panel, an automated production control system, or a device control system, for example. The primary video production control system 102 enables primary, central, or master control of video production in the video production system 100.

The video production control system nodes 110, 112, 116 are remotely controlled by the primary video production control system 102, and examples include additional video production control systems or equipment controlled remotely by the primary video production control system 102, video production switchers, and integrated control system nodes that also include production devices that are used in video production.

Production devices to perform tasks or events that are to be synchronized may be integrated with video production control system nodes, or implemented separately. The example video production system 100 includes a production device 104 directly controlled by the primary video production control system 102, and a production device 114 controlled indirectly by the primary video production control system through a video production control system node 112.

The video production control system nodes 110, 116 are intended to represent examples of integrated video production control system nodes that also include production devices to execute tasks or events. The video production control system node 112 is an example of what may be referred to as an intermediate video production control system node through which the primary video production control system 102 can control another device or piece of equipment, shown as a production device 114. The intermediate video production control system node 112 may be a device or system that supports a native protocol of the primary video production control system 102 or otherwise enables the primary video production control system to communicate with and control the production device 114.

Production devices, whether integrated with a video production control system node or implemented separately, may include any of various types of devices or equipment involved in video production. For example, a production device may be a device or equipment to capture or otherwise generate or provide a production signal, which may be an input for further processing or an output from a video production system. Other types of production devices may be involved in video production, and need not directly capture or provide production signals. Examples of production devices that generate or provide production signals include cameras, audio mixers, video switchers (sometimes called vision mixers), camera motion systems (sometimes called robotic cameras), CGs (often referred to as character generators, but now more commonly called computer graphics systems), video servers, audio servers, video routers, and lighting control systems. Other types of production devices are possible and may also or instead be provided in a video production system.

It should therefore be appreciated that production devices are not necessarily restricted to equipment that captures, collects, or otherwise provides video signals. Production devices as referenced herein are intended to more generally denote devices, systems, or equipment that is used in video production.

Systems, nodes, devices, and equipment as referenced herein encompass individual devices and multi-element or multi-device systems. The primary video production control system 102 and the video production control system nodes 110, 112, 116, for example, may include multiple components. Production devices such as 104, 114 may also or instead include multiple devices or elements, as in the case of motorized or robotic cameras, for example, that include at least a camera and a movement device or subsystem.

Terms such as input, output, and production signal, unless otherwise indicated, are also used herein in a general sense, to denote feeds, sources, video production outputs (e.g., live/television/broadcast video) and/or other forms of inputs or outputs that may be used or generated in video production.

In operation, control signals such as control messages are provided from the primary video production control system 102 to the video production control system nodes 110, 112, 116, and are also provided to the production devices 104, 114 by the primary video production control system 102 and the intermediate video production control system node 112, respectively. In some embodiments, inputs may be provided to the primary video production control equipment 102, by one or more of the video production control system nodes 110, 112, 116 and/or one or more production devices 104. This is an illustrative example, and the embodiments disclosed herein are not restricted only to this type of application. For example, production devices may also or instead provide inputs to one or more other devices or systems, for further processing or to otherwise generate one or more video production outputs for example.

Exchange of timing or synchronization information and control information is shown by way of example in FIG. 1 between the primary video production control system 102 and the video production control system nodes 110, 112, 116. Timing or synchronization information, such as counts or other indices, may be exchanged between components or elements in a video production system. For example, at least the video production control system nodes 110, 112, 116 may be capable of exchanging timing and control information with the primary video production control system 102 to allow for synchronization of tasks or events as disclosed herein. An indirectly controlled device or equipment such as the production device 114 need not exchange timing information with the primary video production control system 102, because synchronization for the production device 114 is handled by the remotely controlled or intermediate video production control system node 112.

For example, in some embodiments the primary video production control system 102 may synchronize events over multiple video production devices or equipment with known and stable communication delays, and remotely with variable communication delays. Timing information exchange for event synchronization as disclosed herein may be supported for connections over which communication delay between devices or equipment is variable or otherwise not stable. Not every device or equipment need necessarily support timing information exchange. For example, the primary video production control system 102 may control one or more devices or equipment without exchanging timing information for event synchronization. Devices or equipment may be controlled locally, as illustrated by way of example in FIG. 1 by the production device 104, or otherwise have known and stable communication delays for which timing information exchange is not implemented. Other devices or equipment may be controlled over connections for which communication delays are variable, and for which synchronization by timing information exchange is implemented. In FIGS. 1, 104 and 114 illustrate production devices to which control information is sent, but which need not exchange timing information with the primary video production control system 102 or a video production control system node 112.

Communications between the primary video production control system 102, the video production control system nodes 110, 112, 116, and production devices 104, 114 may be over any of various types of connections. Even if communications between equipment are over the same types of connections, there may be different delays or latencies in communications between different equipment, such as between the primary video production control system 102 and the video production control system node 110 and between the primary video production control system 102 and the video production control system node 112. Delay or latency may also or instead be variable for communications between the same equipment. For example, delay or latency might not always be the same for communications between the primary video production control system 102 and the video production control system node 110. These and/or other properties or characteristics of communications or connections tend to complicate control and synchronization in a video production system.

Embodiments disclosed herein provide for sequencing or coordination of tasks or events from a central location, of the primary video production control system 102 for example, to one or multiple video systems such as the video production control system nodes 110, 112, 116 for example. A task or event refers to an action that is to be executed or performed by a production device. Such an action may include, for example, changing an input on a remote video router, switcher, or display, or moving a robotic or motorized camera by operating a movement subsystem.

Sequencing or coordination may be implemented in some embodiments according to an approach that involves a primary synchronization source, with one to many secondary sources. For example, in FIG. 1 the primary video production control system 102 may be considered a primary system with a primary source and the video production control system nodes 110, 112, 116 may be considered secondary systems with secondary sources. Each source (primary and secondary) may maintain a clock pulse, or other trigger to increment a count or other index. The trigger has a time period or periodicity (also referred to herein as an increment interval) that is smaller than a maximum desired synchronization error between the primary source and the secondary sources. A factor of 3, with an increment interval of one-third the maximum desired synchronization error, may be used in some embodiments. More generally, an increment interval that is smaller than a maximum desired synchronization error and is expected to provide a bounded synchronization error may be preferred.

The increment interval for incrementing an index may be fixed. In other embodiments, the increment interval is programmable or otherwise configurable. For example, the increment interval may be set by an operator of the primary video production control system 102 and signaled to the video production control system nodes 110, 112, 116 to configure the same increment interval for the primary and secondary synchronization sources.

As an example, a clock signal may be used to provide triggers to increment an index value, and each clock pulse may increment a counter.

On a regular basis, a primary source may send a message containing its current counter or other index value to all secondary sources. Each secondary source, on receiving this message, may determine a difference between the received counter or index value (e.g., value A) and its own counter value (e.g., value B), and then reflect the message back to the primary source. Multiple differences (A-B, or B-A) may be stored by a secondary source, to a circular buffer for example, to maintain a historical record of such differences. A record of at least the most recent 10 difference values may be maintained, for example. More generally, a number of most recent difference values that is expected to reduce or limit the impact of intermittent or outlying high or low difference values may be maintained by a secondary source.

Regarding message reflection from a secondary source to the primary source, this is used in some embodiments by the primary source to determine a minimum safe time that a message from a primary system will take to reach the secondary system. When the primary system is to send a message to the secondary system regarding a task that is to be executed at a specific time in the future, the primary source or system may calculate the specific time of execution based on a worst-case round-trip time as determined for the particular secondary system. This may help ensure that messages are received in sufficient time by the secondary system in order to be executed, by the secondary system or by a separate production device that is controlled by or otherwise associated with the secondary system, at the specific time.

These and other features are also considered in further detail below.

Figure 2:
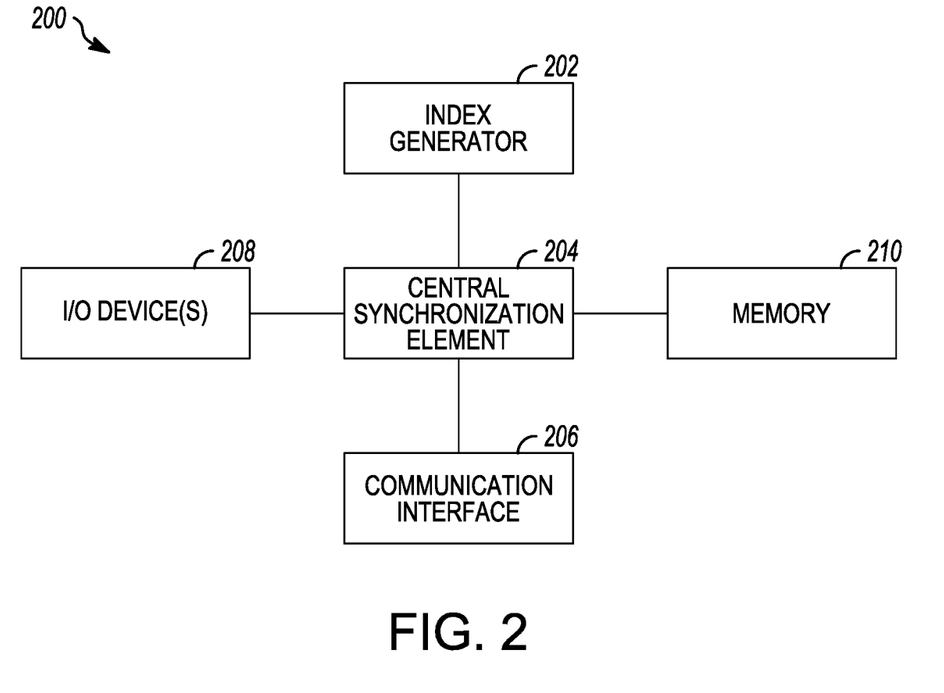
FIG. 2 is a block diagram illustrating an example of a primary video production control system according to an embodiment.

FIG. 2 is a block diagram illustrating an example of a primary video production control system according to an embodiment. A primary video production control system as shown in FIG. 2 may be implemented at 102 in a video production system 100 in FIG. 1, for example.

The example primary video production control system 200 in FIG. 2 includes an index generator 202, a central synchronization element 204 coupled to the index generator, and a communication interface 206, one or more input/output (I/O) devices 208, and a memory 210 to which the central synchronization element is also coupled in the example shown.

In general, components of the example primary video production control system 200 may be implemented using hardware, firmware, processing devices that execute software, or some combination thereof. Microprocessors, Application Specific Integrated Circuits (ASICs), Field Programmable Gate Arrays (FPGAs), and Programmable Logic Devices (PLDs) are examples of processing devices that may be used to execute software stored in the memory 210.

In an embodiment, the index generator 202 includes a counter to count instances or occurrences of a trigger, or in other words to increment a count value based on a trigger. A trigger source may also be part of the index generator 202, or a trigger signal such as a clock signal from which clock pulses increment a count value may be received as an input to the index generator.

The central synchronization element 204 is a processor-based component in some embodiments, and may be implemented by a processor that also provides other features in addition to message-related features disclosed herein.

The communication interface 206 represents one or more physical components at least in the form of a port, connector, or other type of interface component that provides for connection to a communication medium. The present disclosure is not restricted to any particular type of communication medium or protocol. In some embodiments, the communication interface 206 enables communications over an Internet connection, but other types of connections are possible. A single interface, or possibly multiple interfaces, may be provided at 206.

One or more devices to receive user inputs from and/or provide outputs to a user are illustrated at 208. Any of various types of input devices such as a keyboard, a touchscreen, or a mouse may be provided to receive video production control inputs from an operator of a primary video production control system. Similarly, one or more video monitors, speakers, touchscreens, or other output devices may also or instead be provided at 208 so that an operator may monitor video production inputs and/or outputs.

One or more memory devices may implement the memory 210. The memory device(s) may include one or more solid state memory devices and/or memory devices with movable or even removable storage media.

In operation, the communication interface 206 enables communication with a video production control system node. The index generator 202 generates an index value that is periodically incremented, and is used by the central synchronization element 204 in controlling the video production control system node. With reference to an example that is discussed above, the index generator 202 and the central synchronization element 204 may implement a form of primary synchronization source, with one or more secondary sources being implemented at one or more video production control system nodes in a video production system.

The central synchronization element 204 is operative to transmit, to a video production control system node through the communication interface 206, first messages that include respective current index values generated by the index generator 202. The first messages may be sent on a regular basis, such as every 10 clock pulses, triggers, or index value increments. The interval for transmitting first messages may be fixed, or configurable or otherwise variable. An interval of 10 is an illustrative example, and more generally an interval that is expected to provide sufficient samples for primary and secondary system synchronization within a target range or below a maximum error level may be used.

Based on the transmitted first messages and reflections of the first messages received from the video production control system node through the communication interface 206, the central synchronization element 204 may determine a round-trip message time, which may be referred to as a round-trip time, associated with the video production control system node. This round-trip message time may be based on respective differences between a current index value generated by the index generator 202 at receipt of each of the reflections of the first messages and the current value that was generated by the index generator and included in the first messages at transmission of each of the first messages. For example, the central synchronization element 204, or another component of a primary video production control system, may calculate the difference between the current index value generated by the index generator 202 when a reflection is received, and the index value received in the reflection of a message. A difference may be determined for each of multiple messages, and multiple differences may be taken into account in determining the round-trip time or round-trip message time associated with a video production control system node.

As an example, after receiving a reflection of a first message, the central synchronization element 204 or another component of the primary video production control system 200 may compare a current index value difference to a maximum previous round trip time, and if greater than the maximum previous round trip time, make the current index value difference the new maximum. Thus, the round-trip message time associated with a video production control system node may be a maximum round-trip message time among respective round-trip message times for a number of first messages.

The number of differences, round-trip message times, or first messages that are used to determine the round-trip message time associated with video production equipment may be determined based on a safety factor or confidence factor in respect of a further message for execution of a task reaching the video production control system node in sufficient time that the task can be executed at a target execution time. For example, it is expected that after a fairly short time, such as 20 messages, the maximum round-trip message time will provide a safe basis for determining a minimum time that any message should be sent from a primary video production control system to a video production control system node, in advance of target execution time, to have it received in time to be acted upon by the video production control system node or a separate production device at the target execution time.

More generally, in some embodiments the central synchronization element 204 may be configured, by executing software or otherwise for example, to transmit a second message to a video production control system node through the communication interface 206. The second message includes a command or other form of instruction for execution of a task at a target execution time, and is transmitted at a time, in advance of the target execution time, that is based on the round-trip message time associated with the video production control system node.

A command message, referenced above as a second message, may also include a future index value. The future index value may be an expected index value that is expected to be generated by the index generator 202 at the target execution time, less half the round-trip message time associated with the video production control system node. Half the round-trip message time is an example of an estimate of the advance time, before the execution time, at which a second message should be transmitted to a video production control system node so that it will be received in sufficient time for the task or event to be executed by the desired execution time.

Suppose, for example, that a messages is to be transmitted from a primary video production control system to a video production control system node, to have the video production control system node or a separate production device execute a task or event at a specific time in the future. A local counter value or other index value that will be generated by the index generator 202 for the time at which the command should be executed can be calculated and half the round-trip message time, rounded down in some embodiments or rounded up for a higher safety or confidence factor, can be subtracted from the local index value by the central synchronization element 204 or another component of the example primary video production control system 200. This future value may be included in a command message to the video production control system node, to schedule the task or event to be executed by the video production control system node or a separate production device at the target execution time.

Operation examples described above with reference to FIG. 2 are in the context of a primary video production control system and a video production control system node. It is to be noted that embodiments are not restricted to a primary video production control system in conjunction with one video production control system node. There may be multiple video production control system nodes, as shown by way of example in FIG. 1. The communication interface 206 may be configured to enable communication with multiple video production control system nodes. The central synchronization element 204 may be configured to transmit first messages that include respective current index values generated by the index generator 202, to each video production control system node, determine a respective round-trip message time associated with each video production control system node, and transmit a respective second message to each video production control system node at a respective time in advance of the target execution time that is based on the respective round-trip message time associated with each video production control system node. This may be more typical of a video production environment, in which multiple different devices or systems are to be controlled and synchronized.

The communication interface 206 may also be or include an interface to enable communication with one or more production devices (such as the production device 104), which may be referred to as local production devices, that are directly controlled by a primary video production control system.

In a multi-video production control system node system, commands for tasks or events that have the same target execution time may be transmitted to all video production control system nodes at the same time, corresponding to the worst-case or longest of round-trip message times of all of the video production control system nodes involved in the tasks or events. In other embodiments, command messages are transmitted to video production control system nodes at different times in advance of the execution time, based on the round-trip message time associated with each video production control system node. In both of these examples, the time in advance of the target execution time, at which second messages are transmitted to the video production control system nodes, is based on the round-trip message times associated with the video production control system nodes. The second messages may be transmitted to all of the video production control system nodes at the same time (e.g., based on the longest of all of the round-trip message times), or at different times (e.g., based on the respective round-trip message time associated with each video production control system node).

Another possible variation involves an intermediate video production control system node, shown by way of example at 112 in FIG. 1, which is configured to communicate with a production device 114 that is to execute a task at a target execution time. In this type of operating environment, either or both of a round-trip time and a time in advance of a target execution time at which a command message is transmitted may be further based on a communication delay between the intermediate video production control system node 112 and the production device 114 that is to execute a task or event. This intermediate node to executing device delay may be known at the intermediate node and/or at a primary video production control system, and may, for example, be added to a future index value that is included in a command message, or doubled and added to a round-trip message time to determine a "true" round-trip message time between a primary video production control system and an executing video production control system node or production device that is to execute a task or event.

This type of communication delay is an example of a characteristic or parameter that may also be taken into account in synchronizing events. For example, delay on a communication path between an intermediate video production control system node and a production device impacts timing of delivery of a control signal over a control path or connection to a production device that is to execute a task or event. A video path or connection may also or instead have delays that may be taken into account in some embodiments. Video signals may be delayed by a known amount relative to control signals, for example, and an advance time at which a second message is transmitted to a video production control system node may be determined further on the basis of this type of known delay. A control signal or command from a video production control system node, and/or from a primary video production control system, to a production device may also or instead be transmitted at an advance time that is based on a video signal delay. Video signal delay is not necessarily limited to communication delay, and may also or instead include video processing delay associated with video processing such as encoding and/or decoding for example. A delay, such as a video processing delay, may affect task or event execution even for integrated video production control system nodes or locally controlled production devices, and illustrates that synchronization may be important not only in central or remote control scenarios, but also in local control embodiments.

The index generator 202 may be configured to increment the index value based on a clock pulse as described by way of example above. Other possible trigger sources for incrementing a count or other form of index include a Central Processing Unit (CPU) system time, and, in the case of video production, a video frame rate.

Other features may also or instead be implemented in the example primary video production control system 200. For example, as described by way of example at least above, a time interval at which an index value is incremented may be below (by a factor of 3 for example) a maximum synchronization error between the primary video production control system and a video production control system node.

Figure 3:
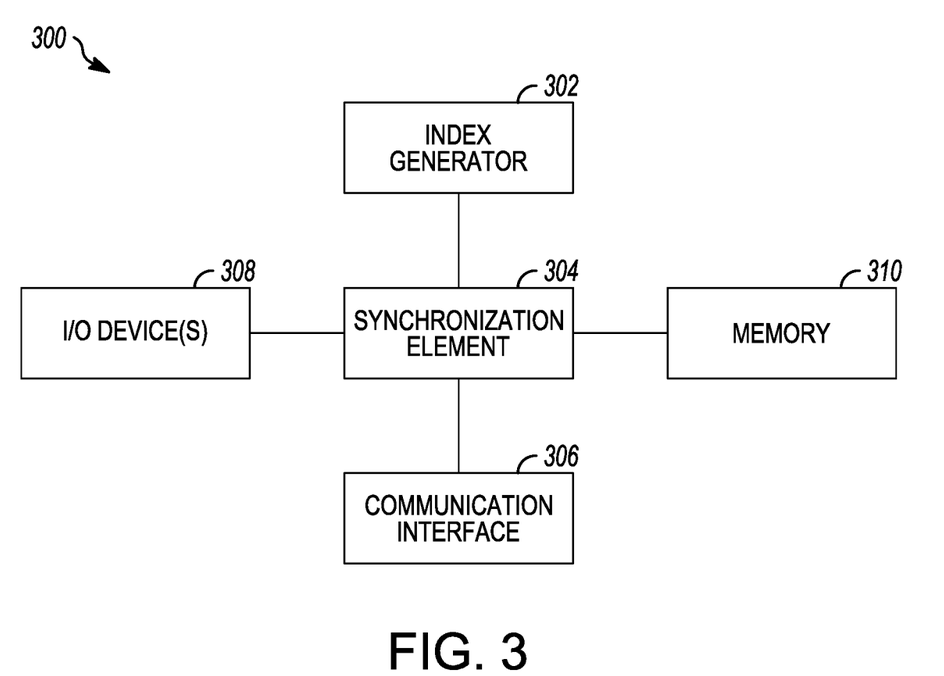
FIG. 3 is a block diagram illustrating an example of a video production control system node according to another embodiment.

FIG. 3 is a block diagram illustrating an example of a video production control system node according to another embodiment. A video production control system node as shown in FIG. 3 may be implemented at any of 110, 112, 116 in a video production system 100 in FIG. 1, for example.

The example video production control system node 300 in FIG. 3 includes an index generator 302, a synchronization element 304 coupled to the index generator, and a communication interface 306, one or more input/output (I/O) devices 308, and a memory 310 to which the synchronization element is also coupled in the example shown.

Although the examples shown in FIGS. 2 and 3 are similar in structure, a primary video production control system as shown by way of example in FIG. 2 and a video production control system node as shown by way of example in FIG. 3 may be implemented in similar or quite different ways. For instance, an I/O device 308 in an integrated video production control system node may include a production device such as a camera, whereas a primary video production control system might not itself, and typically does not, capture inputs for video production. Also, whereas a primary video production control system is expected to support control inputs from an operator, a video production control system node may or may not support local user inputs and/or outputs.

In general, despite differences between actual equipment implementations for a primary video production control system and a video production control system node, implementation options for components of the example video production control system node 300 may be similar to those provided above for the example primary video production control system 200. The components shown in FIG. 3 may be implemented using hardware, firmware, processing devices that execute software, or some combination thereof. The processing device examples provided above for the example primary video production control system 200 also apply to the example video production control system node 300.

Similarly, the index generator, memory, and communication interface options provided above for the example primary video production control system 200 also apply, to at least some extent, to the example video production control system node 300. The communication interface 306 is or includes a communication interface that is compatible with a communication interface of a primary video production control system. The communication interface 306 may also be or include a communication interface that is compatible with a production device, in embodiments in which the example video production control system node is an intermediate video production control system node as shown at 112 in FIG. 1, for example.

The I/O devices 308 need not necessarily be provided in video production control system nodes, but may include one or more sensors as noted at least above, and may or may not include devices to receive user inputs from or provide outputs to a user.

The synchronization element 304 is a processor-based component in some embodiments, and may be implemented by a processor that also provides other features in addition to message-related features disclosed herein.

In operation, the example video production control system node 300 provides counterpart features to many of those described herein with reference to FIG. 2. Other features may also or instead be provided.

The communication interface 306 enables communication with a primary video production control system. The index generator 302 generates an index value that is periodically incremented, and is used by the synchronization element 304 as described at least below. With reference to an example that is discussed above, the index generator 302 and the synchronization element 304 may implement a form of secondary synchronization source in a video production system.

The synchronization element 304 is operative to receive, from a primary video production control system through the communication interface 306, first messages that include respective current index values generated by a second index generator (e.g., 202 in FIG. 2) of the primary video production control system.

Based on respective index values generated by the index generator 302 at reception of the first messages, and the index values in the received first messages, the synchronization element 304 may determine respective difference values. In some embodiments, a number of the difference values are stored in the memory 310, for example in a circular buffer as described elsewhere herein.

The synchronization element 304 is also operative to transmit, to the primary video production control system, reflections of the first messages.

A second message that includes an instruction for execution of a task at a target execution time may be received from the primary video production control system through the communication interface 306, by the synchronization element 304 or another component of the video production control system node 300. This second message would have been transmitted by the primary video production control system at a time, in advance of the target execution time, that is based on a round-trip message time determined by the primary video production control system. The round-trip message time is determined in some embodiments from the respective index values generated by the second index generator (of the primary video production control system) at the respective transmission times of the first messages and respective index values generated by the second index generator (of the primary video production control system) at respective reception times of reception of the reflections of the first messages by the primary video production control system.

As noted, a number of difference values may be stored in the memory 310. In some embodiments, the synchronization element 304 is further configured to determine an average difference value based on the difference values stored in the memory 310, and to determine a future value that will be generated by the index generator 302 at the target execution time. This future value to be generated by the index generator 302 at the target execution time may be determined as a difference between the future index value, that was determined by the primary video production control system and included in the second message, and the average difference value determined by the synchronization element 304. Using notation of A' as the future value in the second message and (A-B) as the average difference value, then the future index value B' to be generated by the index generator 302 at the target execution time may be determined as A'−(A−B)=B', which gives the index of the index generator 302 at which the task should be executed. When the index generator 302 reaches B', the instruction in the second message should be processed and the task should be executed.

The number of differences that are used to determine the future value to be generated by the index generator 302 at the target execution time may be selected based on a safety factor or confidence factor in respect of the task being executed at the target execution time. For example, it is expected that 10 difference values will provide a safe basis for determining a count value or other index value at which a task is to be executed. Other values may also or instead be used. The number of samples used by a primary video production control system in determining round-trip message time and the number of difference values used by a controlled video production control system node in determining the future index value to be generated by the index generator 302 at the target execution time may be the same or different.

In the case of an intermediate video production control system node, shown by way of example at 112 in FIG. 1, which is configured to communicate with a production device 114 that is to execute a task at a target execution time, a communication delay between the intermediate video production control system node and the production device that is to execute a task or event may also be taken into account. The future index value to be generated by the index generator 302 at the target execution time may be determined or revised based on the communication delay, for example. In an embodiment, the intermediate video production control system node is configured to communicate with the production device that is to execute a task or event at a further time, in advance of the target execution time, that is based on the communication delay. An index value that is equivalent to the communication delay may be subtracted from the future index value to determine an index value or time before the target execution time, at which the intermediate video production control system node is to communicate with the production device so that the task or event is executed at the target execution time. Another possible option is to determine, as the future index value, an index value that is to be generated by the index generator 302 at the time in advance of the target execution time at which the intermediate video production control system node should communicate with the executing production device. Taking the communication delay between the intermediate video production control system node and the executing production device into account enables synchronization of task or event execution by an indirectly controlled device.

Communication delay is not the only parameter or characteristic based upon which an advance time may be determined. Other examples are provided elsewhere herein, such as above in the context of FIG. 2.

As in other embodiments disclosed herein, the index generator 302 may be configured to increment the index value based on a clock pulse, and other possible trigger sources for incrementing a count or other form of index include a CPU system time and a video frame rate.

Other features may also or instead be implemented in the example video production control system node 300.

Embodiments are described above primarily in the context of example apparatus or equipment. Other embodiments are also possible.

Figure 4:
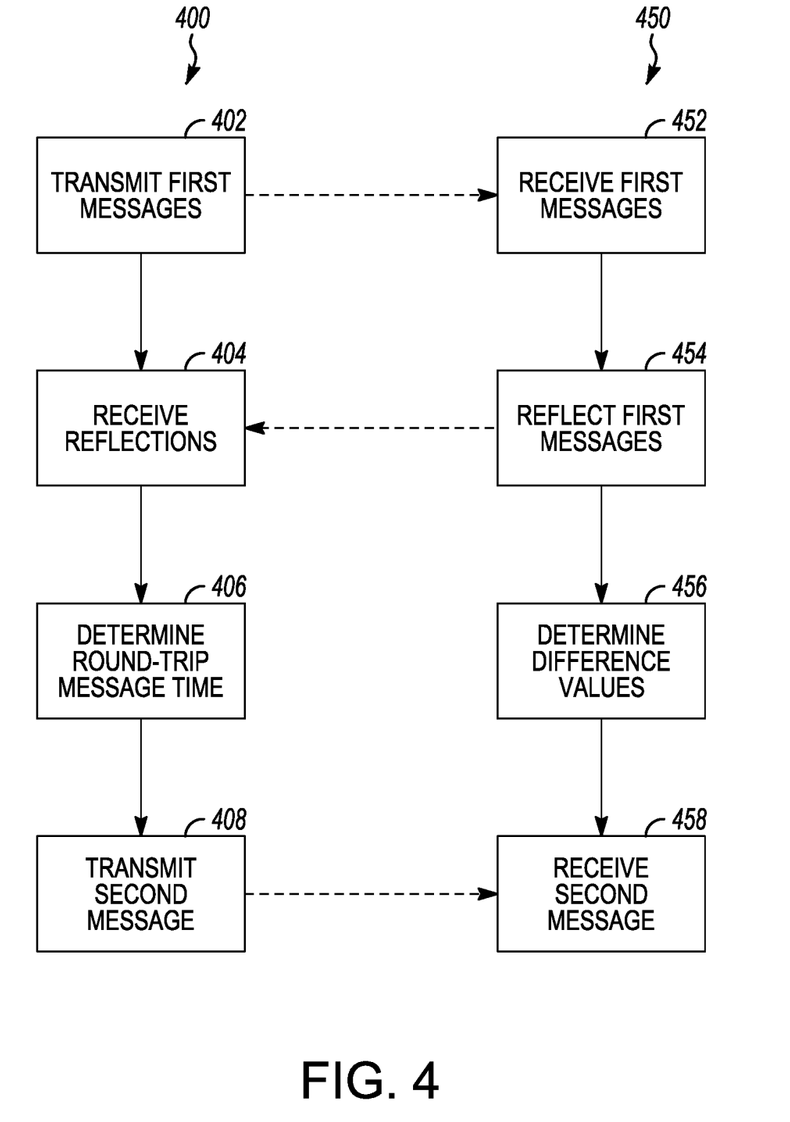
FIG. 4 is a flow diagram of an example method.

FIG. 4, for example, is a flow diagram of an example method. FIG. 4 illustrates operations 400 that may be performed at a primary video production control system, and operations 450 that may be performed at a video production control system node in some embodiments.

In an embodiment, as shown at 402 a method may involve transmitting, to a video production control system node, first messages that include or indicate respective current index values that are periodically incremented. At 406, FIG. 4 illustrates determining a round-trip message time. The round-trip message time is associated with the video production control system node, and is determined based on the transmitted first messages and reflections of the first messages received from the video production control system node at 404. The example shown at 400 also involves transmitting, to the video production control system node, a second message. This is shown at 408. The second message includes or otherwise indicates an instruction for execution of a task at a target execution time, and is transmitted at a time, in advance of the target execution time, that is based on the round-trip message time.

The example shown at 400 in FIG. 4 is intended to represent one embodiment. Other features may also or instead be provided in other embodiments. For example, the determining at 406 may involve determining the round-trip message time based on respective differences between a current index value at receipt of each of the reflections of the first messages and the current value at transmission of each of the first messages.

In some embodiments, the round-trip message time associated with the video production control system node is a maximum round-trip message time among respective round-trip message times for a number of the first messages.

The second message transmitted at 408 may include a future index value that is an expected index value at the target execution time less half the round-trip message time associated with the video production control system node.

The index value may be incremented based on a clock pulse, a CPU system time, and a video frame rate, as noted elsewhere herein.

A time interval at which the index value is incremented is below a maximum synchronization error in some embodiments.

One or more of the operations illustrated at 400 may be repeated, for each of multiple video production control system nodes for example. First messages that include or indicate respective current index values may be transmitted to each of multiple video production control system nodes at 402, for example, a respective round-trip message time associated with each video production control system node may be determined at 406, and a respective second message may be transmitted to each video production control system node at 408 at a time in advance of the target execution time that is based on the round-trip message times associated with each video production control system node.

Transmitting a respective second message to each of multiple nodes may involve transmitting the respective second message to each video production control system node at a respective time in advance of the target execution time that is based on the respective round-trip message time associated with each video production control system node, or at a same time in advance of the target execution time that is based on a longest of the respective round-trip message times of the video production control system nodes.

A video production control system node may be an intermediate video production control system node in some embodiments. An intermediate node is configured to communicate with a production device that is to execute the task at the target execution time, as noted elsewhere herein. Either or both of the determined round-trip time and the time in advance of the target execution time may be further based on a communication delay between the intermediate video production control system node and the production device.

One or more of transmitting the first messages at 402, receiving the reflections of the first messages at 404, and transmitting the second message at 408 may involve communication with the video production control system node over an Internet connection, or another type of connection in other embodiments.

The operations at 450 in FIG. 4 are illustrative of a method that involves receiving at 452, from a primary video production control system, first messages that include or otherwise indicate respective index values generated by the primary video production control system at respective transmission times of the first messages. Transmitting reflections of the first messages to the primary video production control system is illustrated at 454 as reflecting the first messages.

Respective difference values based on index values generated at reception times of the first messages at 452 and the index values in the received first messages are determined at 456. As shown at 458, the illustrated example also involves receiving, from the primary video production control system, a second message that includes or otherwise indicates an instruction for execution of a task at a target execution time. The second message was transmitted, at 408 for example, by the primary video production control system at a time in advance of the target execution time. That advance time is based on a round-trip message time determined by the primary video production control system from the respective index values in the first messages and respective index values generated by the primary video production control system at respective reception times of the reflections of the first messages.

Other features may be provided in some embodiments. For example, a method may involve storing a number of the difference values (determined at 456) in a memory.

In some embodiments, the second message received at 458 further includes or otherwise indicates a future index value to be generated by the primary video production control system at the target execution time. A method may then involve determining an average difference value based on the difference values stored in the memory, and determining a difference between the future index value in the second message and the average difference value.

Index values generated by a node at reception times of the first messages at 452 may be incremented based on, for example, a clock pulse, a CPU system time, and a video frame rate.

Although not shown in FIG. 4, a method may involve, after a second message is received at 458, communicating with a production device that is to execute the task at the target execution time. Communicating with the production device may involve communicating with the production device at a further time, in advance of the target execution time, that is based on a communication delay between the intermediate video production control system node and the production device.

Any of receiving the first messages at 452, transmitting the reflections of the first messages at 454, and receiving the second message at 458 may involve communication with the primary video production control system over an Internet connection, or another type of connection in other embodiments.

An overall video production method may involve operations at a primary control system and operations at one or more control system nodes. For example, a method as shown at 400 and/or otherwise disclosed herein may be performed at a primary video production control system, and a method as shown at 450 and/or otherwise disclosed herein may be performed at one or more video production control system nodes.

Other features disclosed herein, with reference to apparatus embodiments for example, may also or instead be implemented in method embodiments.

Embodiments disclosed herein encompass synchronization of events across multiple systems of any form.

An index-based approach as disclosed herein may be beneficial in that no external time reference is involved in synchronization. For example, with the same increment interval (within a small margin of error) between a primary video production control system and video production control system nodes, using multiple differences for synchronization, such as by averaging differences in indices, accommodates or adjusts for index realignment. As a secondary clock at a video production control system node drifts, for example, the differences in indices in a circular buffer will increase to match the drift and maintain an acceptable degree of alignment between index incrementing, such as within one or two clock periods.

With careful selection of an increment interval for incrementing indices, synchronization may be tailored to a desired, required, or target range, to result in an event taking place on a production device within 2 clock periods of target execution time, for example.

Embodiments disclosed herein may provide a bounded error in synchronization of events. Error is determined by the amount of time between two synchronized events. Zero error means that the events happen simultaneously. Bounded error provides upper and lower limits on how far apart synchronized events will be. If all synchronized events are within 2 clock periods of a target execution time, for example, then the events will be at most 4 clock periods apart. Sometimes, between video shots for example, a video screen will be covered with an animation while video output is changed underneath the animation, and then the animation is removed to reveal the new video output. Having known bounds on synchronization of events allows operators to know in advance how long an animation should be displayed.

What has been described is merely illustrative of the application of principles of embodiments of the invention. Other arrangements and methods can be implemented by those skilled in the art without departing from the scope of the present invention.

For example, the divisions of functions as shown in FIGS. 2 and 3 are intended solely for illustrative purposes. Embodiments may be implemented with fewer, additional, and/or different components than those explicitly shown.

Other features may also or instead be provided in some embodiments. For example, counter overflow may be taken into account in counter-based embodiments. A change in sign or polarity of round-trip message time, for example, may be indicative of a counter overflow, and in such embodiments a counter maximum value may be added to or subtracted from a round-trip message time to adjust for counter overflow.

For example, consider the following progression of indices and corresponding difference values:

| Index Value A | Index Value B | Difference (A − B) |
|---|---|---|
| 1 | 2 | −1 |
| 2 | 3 | −1 |
| 3 | 4 | −1 |
| 4 | 1 | 3 |
| 1 | 2 | −1 |
| 2 | 3 | −1 |

In this example, a change in sign of the difference value from −1 to 3 indicated an overflow, and subtracting the maximum value of 4 from the difference corrects for the overflow.

For round-trip times, positive values may generally be preferred, and accordingly a negative round-trip time is indicative of overflow in some embodiments. More generally, a change in sign or polarity may be indicative of overflow of an index that used in determining round-trip time.

Although overflow is referenced herein, indices could be changed in negative increments in other embodiments, in which case indices may underflow and indices, differences, or times may be adjusted for underflow.

Although not explicitly noted above, using multiple values to determine round-trip message times and/or index future values may also be beneficial in accounting for clock drift or drift of any other form of trigger signal that is used for index generation. A circular buffer continually updating index or time differences, for example, may automatically mitigate effects of clock or trigger signal drift.

The exact format of control messages, such as the first and second messages above, that are exchanged between a primary video production control system and controlled devices or equipment could be implementation-dependent. The present disclosure is not limited to any particular message or signaling format(s) or protocol(s).

In addition, although described primarily in the context of production systems and methods, other implementations are also contemplated, as instructions stored on one or more non-transitory computer-readable storage media, for example.

The invention claimed is:

1. An apparatus comprising:
an index generator to generate an index value that is periodically incremented;
a communication interface to enable communication with a video production control system node;
a central synchronization element, coupled to the index generator and to the communication interface, to:
transmit, to the video production control system node through the communication interface, first messages comprising respective current index values generated by the index generator;
determine a round-trip message time, associated with the video production control system node, based on the transmitted first messages and reflections of the first messages received from the video production control system node through the communication interface; and
transmit, to the video production control system node through the communication interface, a second message comprising an instruction for execution of a task at a target execution time, wherein the central synchronization element is configured to transmit the second message at a time, in advance of the target execution time, that is based on the round-trip message time.

2. The apparatus of claim 1, wherein the central synchronization element is configured to determine the round-trip message time based on respective differences between a current index value generated by the index generator at receipt of each of the reflections of the first messages and the current value generated by the index generator at transmission of each of the first messages.

3. The apparatus of claim 1, wherein the round-trip message time associated with the video production control system node is a maximum round-trip message time among respective round-trip message times for a number of the first messages.

4. The apparatus of claim 1, wherein the second message further comprises a future index value, the future index value comprising an expected index value to be generated by the index generator at the target execution time less half the round-trip message time associated with the video production control system node.

5. The apparatus of claim 1,
wherein the communication interface is configured to enable communication with a plurality of video production control system nodes; and
the central synchronization element is configured to:
transmit first messages, comprising respective current index values generated by the index generator, to each video production control system node,
determine a respective round-trip message time associated with each video production control system node, and
transmit a respective second message to each video production control system node at a time in advance of the target execution time that is based on the round-trip message times associated with each video production control system node.

6. The apparatus of claim 5, wherein the central synchronization element is configured to transmit the respective second message to each video production control system node at a respective time in advance of the target execution time that is based on the respective round-trip message time associated with each video production control system node, or at a same time in advance of the target execution time that is based on a longest of the respective round-trip message times of the video production control system nodes.

7. The apparatus of claim 1, wherein the video production control system node comprises an intermediate video production control system node configured to communicate with a production device that is to execute the task at the target execution time, wherein either or both of the determined round-trip time and the time in advance of the target execution time is further based on a communication delay between the intermediate video production control system node and the production device.

8. A video production system comprising:
a primary video production control system comprising the apparatus of claim 1; and
the video production control system node.

9. An apparatus comprising:
a first index generator to generate an index value that is periodically incremented;
a communication interface to enable communication with a primary video production control system;
a synchronization element, coupled to the first index generator and to the communication interface, to:
receive, from the primary video production control system through the communication interface, first messages comprising respective index values generated by a second index generator of the primary video production control system at respective transmission times of the first messages;
determine respective difference values based on respective current index values generated by the first index generator at reception of the first messages and the index values in the received first messages;
transmit, to the primary video production control system through the communication interface, reflections of the first messages; and,
receive, from the primary video production control system through the communication interface, a second message comprising an instruction for execution of a task at a target execution time, the second message having been transmitted by the primary video production control system at a time, in advance of the target execution time, that is based on a round-trip message time determined by the primary video production control system from the respective index values generated by the second index generator at the respective transmission times of the first messages and respective index values generated by the second index generator at respective reception times of the reflections of the first messages by the primary video production control system.

10. The apparatus of claim 9, further comprising:
a memory coupled to the synchronization element,
wherein the synchronization element is configured to store a number of the difference values in the memory,
wherein the second message further comprises a future index value,
wherein the synchronization element is further configured to determine an average difference value based on the difference values stored in the memory, and to determine a future value to be generated by the first index generator at the target execution time as a difference between the future index value in the second message and the average difference value.

11. The apparatus of claim 9, comprising an intermediate video production control system node configured to communicate with a production device that is to execute the task at the target execution time, wherein the intermediate video production control system node is configured to communicate with the production device at a further time, in advance of the target execution time, that is based on a communication delay between the intermediate video production control system node and the production device.

12. A video production system comprising:
a video production control system node comprising the apparatus of claim 9; and
the primary video production control system.

13. A method comprising:
transmitting, to a video production control system node, first messages comprising respective current index values that are periodically incremented;
determining a round-trip message time, associated with the video production control system node, based on the transmitted first messages and reflections of the first messages received from the video production control system node; and
transmitting, to the video production control system node, a second message comprising an instruction for execution of a task at a target execution time, wherein the second message is transmitted at a time, in advance of the target execution time, that is based on the round-trip message time.

14. The method of claim 13, wherein the determining comprises determining the round-trip message time based on respective differences between a current index value generated at receipt of each of the reflections of the first messages and the current value generated at transmission of each of the first messages.

15. The method of claim 13, wherein the round-trip message time associated with the video production control system node is a maximum round-trip message time among respective round-trip message times for a number of the first messages.

16. The method of claim 13, wherein the second message further comprises a future index value, the future index value comprising an expected index value at the target execution time less half the round-trip message time associated with the video production control system node.

17. The method of claim 13, further comprising, for each of a plurality of video production control system nodes:

transmitting first messages, comprising respective current index values, to each video production control system node, determining a respective round-trip message time associated with each video production control system node, and transmitting a respective second message to each video production control system node at a time in advance of the target execution time that is based on the round-trip message times associated with each video production control system node.

18. The method of claim 17, wherein transmitting a respective second message comprises transmitting the respective second message to each video production control system node at a respective time in advance of the target execution time that is based on the respective round-trip message time associated with each video production control system node, or at a same time in advance of the target execution time that is based on a longest of the respective round-trip message times of the video production control system nodes.

19. The method of claim 13, wherein the video production control system node comprises an intermediate video production control system node configured to communicate with a production device that is to execute the task at the target execution time, wherein either or both of the determined round-trip time and the time in advance of the target execution time is further based on a communication delay between the intermediate video production control system node and the production device.

20. A method comprising:

receiving, from a primary video production system, first messages comprising respective index values generated by the primary video production control system at respective transmission times of the first messages;

determining respective difference values based on index values generated at reception times of the first messages and the index values in the received first messages;

transmitting, to the primary video production control system, reflections of the first messages; and receiving, from the primary video production control system, a second message comprising an instruction for execution of a task at a target execution time, the second message having been transmitted by the primary video production control system at a time, in advance of the target execution time, that is based on a round-trip message time determined by the primary video production control system from the respective index values in the first messages and respective index values generated by the primary video production control system at respective reception times of the reflections of the first messages.

21. The method of claim 20, further comprising:

storing a number of the difference values in a memory wherein the second message further comprises a future index value to be generated by the primary video production control system at the target execution time, the method further comprising:

determining an average difference value based on the difference values stored in the memory;

determining a difference between the future index value in the second message and the average difference value.

22. The method of claim 20, further comprising:

communicating with a production device that is to execute the task at the target execution time, wherein communicating with the production device comprises communicating with the production device at a further time, in advance of the target execution time, that is based on a communication delay between the intermediate video production control system node and the production device.

23. A non-transitory computer-readable storage medium storing instructions which, when executed by a processor, cause the processor to perform the method of claim 13.

24. A non-transitory computer-readable storage medium storing instructions which, when executed by a processor, cause the processor to perform the method of claim 20.

* * * * *